June 14, 1949.  J. A. MULLER  2,473,441
HOSE COUPLING
Filed Feb. 4, 1946
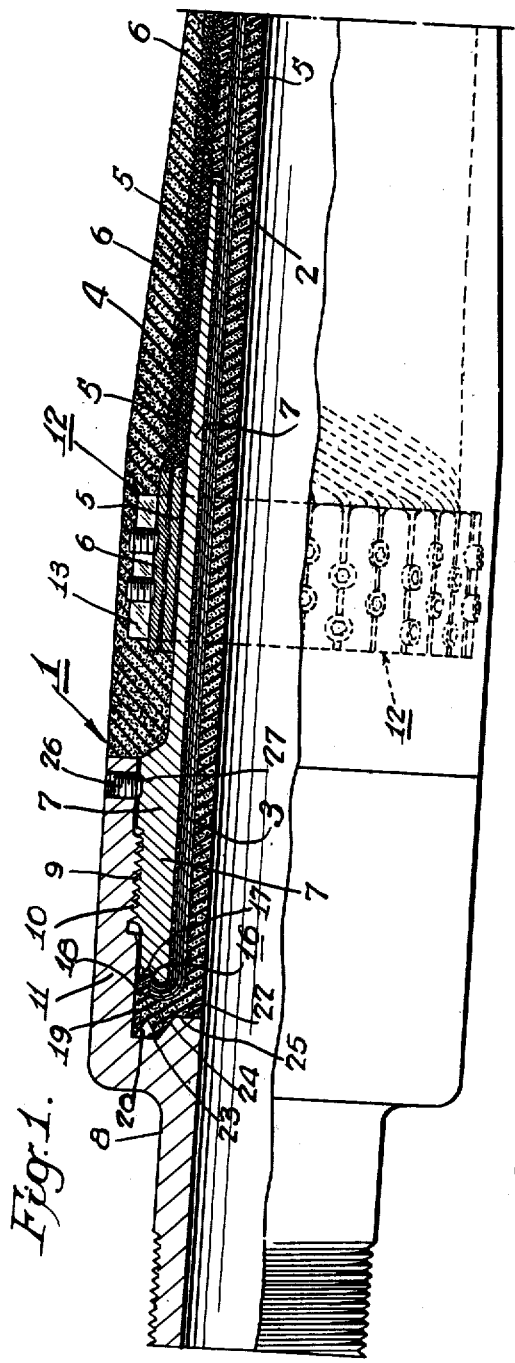
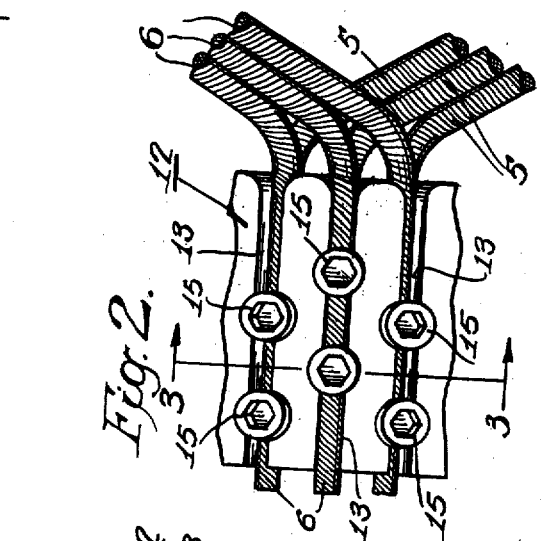
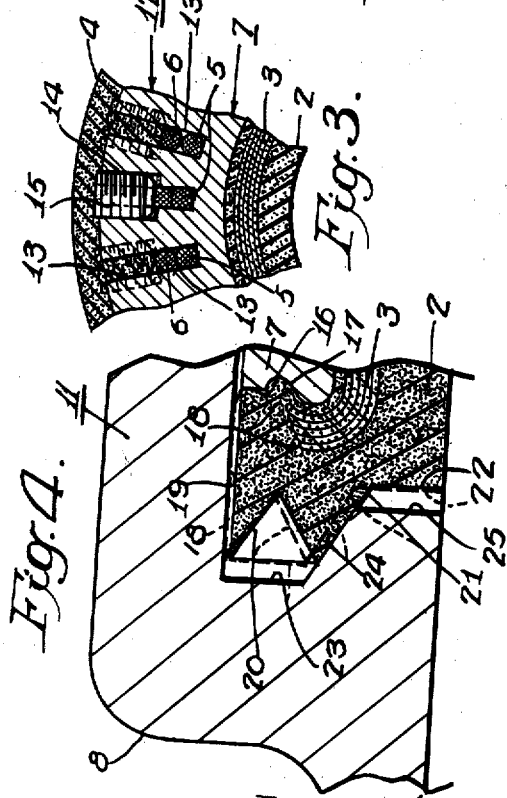
Inventor:—
John A. Muller
by his Attorneys
Howson + Howson Patented June 14, 1949

2,473,441

UNITED STATES PATENT OFFICE 2,473,441

HOSE COUPLING

John A. Muller, Princeton, N. J., assignor to Thermoid Company, Trenton, N. J., a corporation of Delaware Application February 4, 1946, Serial No. 645,275

8 Claims. (Cl. 285—72)

This invention relates to new and useful improvements in hose couplings, and more particularly to couplings for heavy duty hose normally subjected to high internal pressures and complex stresses caused by hard usage, flexing and end loads.

Hose of this type is well-known in the art and usually has strands of wire or cable embedded therein which extend in spiral courses from end to end of the hose and are anchored to the connectors at the ends of the hose body to thereby secure the hose body to the connectors and generally strengthening the juncture between the connectors and the hose body. Provision also is sought to be made in hose of this type to produce a fluid-tight seal or joint between the hose connectors and coupling members.

In the past considerable difficulty has been encountered in existing hose structures due to the fact that prior arrangements for anchoring the wires or cables to the hose connectors do not provide the precise placement of the individual wires or cables with respect to one another that is required to insure uniform spacing of the wires or cables and the elimination of open voids therebetween through which the underlying hose structure may rupture. Substantial difficulty also has been experienced in providing a hose construction that will provide an adequate fluid-tight seal between the coupling and connector.

Accordingly, it is an object of the present invention to provide a hose and connector construction which embodies novel means for anchoring to the connector the wires or cables embedded in the body of the hose so that such wires or cables are precisely disposed with respect to one another.

Another object of the invention is to provide a hose connector construction of the character set forth wherein the cable anchoring means is constructed and arranged to withstand stresses in excess of the strength of the wires or cables.

Another object of the invention is to provide a hose and coupling structure which is constructed and arranged to withstand stresses in excess of those capable of being withstood by the body of the hose.

A further object of the invention is to provide a hose and connector construction which provides an adequate fluid-tight seal between the connector and a coupling member operable to prevent internal pressure in the hose from causing leakage through the seal or through the body of the hose.

These and other objects of the invention and the various features and details of the construction and arrangement thereof are fully set forth and described herein with reference to the accompanying drawing, in which:

Fig. 1 is a partial sectional view longitudinally through a hose and coupling embodying the present invention.

Fig. 2 is an enlarged fragmentary elevational view showing the manner in which the reenforcing cables embodying the hose are anchored and secured to the hose connector member.

Fig. 3 is a sectional view taken on line 3—3, Fig. 2; and

Fig. 4 is an enlarged fragmentary sectional view showing the manner in which a fluid-tight seal is provided between the hose connector and the coupling members.

Referring now more particularly to the drawing, a hose body made according to the present invention is generally designated by the numeral 1 and comprises an inner rubber tube portion 2 embedded in which are a plurality of layers of fabric 3, and an outer rubber layer 4 in which are embedded an inner layer of spirally wound twisted wire cables 5 and an outer layer of spirally wound twisted wire cables 6. The inner cables 5 may be wound in an upward righthand spiral manner and the outer cables 6 may be wound in an upward lefthand spiral manner.

In accordance with the present invention there is secured in the end of the hose body 1, a connector sleeve member 7 which is adapted to be connected to a coupling member 8. As shown in Fig. 1, the end portion of the hose body 1 is divided into inner and outer plies comprising the inner rubber tube 2 and the outer rubber layer 4, respectively, and the connector sleeve 7 is inserted between these inner and outer plies of the hose so that the inner rubber tube 2 is in contact with the inner bore surface of said sleeve and the outer rubber layer 4 is in contact with the outer surface of the sleeve.

The sleeve 7 is relatively thicker at its longitudinally outer end and is externally threaded as indicated at 9 for screw engagement with threads 10 formed internally of an outwardly overlying cup-shaped portion 11 of the coupling member 8. Formed integral with or permanently secured upon the connector sleeve 7 circumferentially thereof and approximately midway between the ends of said sleeve is an annular ring portion or enlargement 12. This ring portion or enlargement 12 is provided with a plurality of radial openings 13 which extend longitudinally of the sleeve 7 parallel to the axis of the bore of the hose and connector assembly. These openings 13 are provided in the ring portion or enlargement 12 at equally spaced intervals circumferentially thereof, and the number of such openings 13 provided in the member 12 is equal to the number of wires or cables 5 or 6 comprising in the inner or outer spirally wound layers thereof that are embedded in the layer 4 of the hose body 1.

The openings 13 provided in the sleeve portion or enlargement 12 have a radial depth substantially greater than twice the diameter of the wires or cables 5 and 6 in order that the end portions of corresponding wires or cables 5 and 6 of both the inner and outer spirally wound layers thereof may be inserted in each of said openings 13. Thus, as shown in Fig. 2 of the drawing, in each opening 13 there is inserted the end portion of one cable 5 in the inner spirally wound layer and also the end portion of the corresponding cable 6 of the outer spirally wound layer. Each of the openings 13 is counterbored and tapped, as indicated at 14 in Fig. 3, to receive a screw member 15 which is threaded therein and tightened to securely clamp and anchor the end portions of the cables 5 and 6 against displacement from the openings 13 in the ring or enlargement 12. Each of the openings 13 preferably is provided with at least two such screw members 15 and, as shown in Fig. 2 of the drawing, the positioning of the screw members 15 may be staggered as between adjacent openings 13 in cases where the latter are closely spaced.

When the end portions of the cables 5 and 6 of the inner and outer spirally wound layers are anchored in the several openings 13 of the sleeve ring or enlargement 12 in the manner described, rubber in proper quantity is applied over the layers of cables 5 and 6 and the sleeve 7 to form the outer rubber layer 4 of the hose body, and this rubber is then vulcanized so that the spirally wound layers of wires or cables 5 and 6, the ring or enlargement 12 of the sleeve in which the cable ends are anchored, are embedded within the vulcanized outer rubber layer 4, for example, in the manner shown in Fig. 1 of the drawing.

The outer end of the connector sleeve 7 provides an annular face 16 in which there is formed an annular recess or groove 17 of arcuate cross-section, and the outer end of the inner layer 2 of the hose body 1 is formed and molded around and over the end face 16 of the connector sleeve 7 to provide a flange or ring 18 which has its base keyed in the groove 17 as shown. As shown in Fig. 4 of the drawing, the external diameter of the flange or ring 18 is slightly less than the diameter of the inner wall surface 19 of the surrounding cup portion 11 of the coupling member 8 and formed in the end face of the flange or ring of the hose body is an annular recess or groove 20 of V-shape in cross-section. The inner surface 21 of the flange or ring 18 of the hose body 1 is angularly disposed and slopes inwardly to intersect a radially disposed annular face or seat 22 which surrounds the bore through said hose body.

The coupling member 8 is provided with an annular groove or recess 23 substantially conforming to the cross-sectional configuration of the hose flange or ring 18 and the inner wall 24 of this recess 23 slopes outwardly substantially at the same angle as the surface 21 of the hose flange or ring 18. This angular surface 24 of the coupling terminates at its endwise edge in a radially disposed annular face 25 which surrounds the bore through the coupling 8.

The construction and arrangement of the hose flange or ring 18 and the recess or groove 23 of the coupling member 8 is such that as the latter is threaded upon the connector sleeve 7 and tightened, the radially disposed annular face 25 of the coupling will seat against the corresponding annular face 22 of the hose body 1, and the angular surface 24 of the coupling 8 engages against the angular surface 21 of the hose flange or ring 18 at the inner side of the groove or recess 20 to thereby compress the flange or ring 18 and force the periphery thereof outwardly and tightly against the adjacent inner surface 19 of the portion 11 of the coupling 8, from the solid line position shown in Fig. 4 to the dotted line position indicated therein, to provide a fluid-tight seal therebetween and effectively prevent any leakage between the hose flange or ring 18 and the inner wall surface 19 of the coupling 8. The coupling member 8 may be secured in its coupled relation with respect to the connector sleeve 7 by means of one or more set screws 26 threaded inwardly of the coupling cup portion 11 and engaging suitably formed recesses 27 in the external surface of the said sleeve 7.

A hose structure constructed as herein shown and described provides a hose of the character set forth wherein the reinforcing cables or wires embedded in the hose body may be anchored to a connector means in a manner to insure the precise placement of the wires or cables with respect to one another and the elimination of voids therebetween through which the underlying hose might rupture. The hose construction of the present invention also provides an effective anchor for the reinforcing wires or cables which will withstand stresses both in excess of the strength of such wires or cables and in excess of the stresses capable of being withstood by the hose body per se. In addition, the hose structure of the present invention provides an efficient fluid-tight seal between the hose connector and coupling member that effectively prevents the internal pressure within the hose from leaking through the seal or through the body of the hose.

While a particular embodiment of the present invention has been illustrated and described herein, it is not intended to limit the invention to such disclosure and changes and modifications may be made therein and thereto within the scope of the claims.

I claim:

1. In a hose structure, a connector sleeve having an annular end face and a plurality of axially extending radial openings in the external surface of the sleeve at equally spaced intervals circumferentially thereof, a hose including inner and outer plies connected at one end to said connector sleeve with the inner ply of said hose extending through the sleeve and having an annular end flange portion overlying the annular end face of said sleeve and the outer ply of said hose overlying the exterior of said sleeve, inner and outer spirally wound layers of wires embedded in said outer ply of the hose and extending from end to end thereof with the end portions of a corresponding wire of each layer disposed in each of said axially extending openings on the connector sleeve, means to anchor said end portions of the wires in said openings, a coupling member receiving said sleeve and having an angularly disposed surface engaging interiorly of the hose end flange to force the same outwardly against the surrounding coupling member and provide a fluid-tight seal.

2. In a hose structure, a connector sleeve having an annular end face and a plurality of axially extending radial openings in the external surface of the sleeve at equally spaced intervals circumferentially thereof, a hose including inner and outer plies connected at one end to said connector sleeve with the inner ply of said hose extending through the sleeve and having an annular end flange portion overlying the annular end face of said sleeve and the outer ply of said hose overlying the exterior of said sleeve, said annular end flange of the hose inner ply having an outwardly diverging inner wall, inner and outer spirally wound layers of wires embedded in said outer ply of the hose and extending from end to end thereof with the end portions of a corresponding wire of each layer disposed in each of said axially extending openings on the connector sleeve, means to anchor said end portions of the wires in said openings, a coupling member receiving said sleeve and having an angularly disposed surface engaging interiorly against said diverging inner wall of the hose end flange to force the same outwardly against the surrounding coupling member and provide a fluid-tight seal.

3. In a hose structure, a connector sleeve having an annular end face and a plurality of axially extending radial openings in the external surface of the sleeve at equally spaced intervals circumferentially thereof, a hose including inner and outer plies connected at one end to said connector sleeve with the inner ply of said hose extending through the sleeve and having an annular end flange portion overlying the annular end face of said sleeve and the outer ply of said hose overlying the exterior of said sleeve, said annular end flange of the hose having a groove in the end face thereof and having an angularly diverging annular inner wall, inner and outer spirally wound layers of wires embedded in said outer ply of the hose and extending from end to end thereof with the end portions of a corresponding wire of each layer disposed in each of said exially extending openings on the connector sleeve, means to anchor said end portions of the wires in said openings, a coupling member receiving said sleeve and having an annular recess therein receiving said hose end flange, said recess of the coupling having an angular inner wall correspondingly disposed with respect to the angular inner wall of the hose end flange and engaging interiorly against the same to displace said end flange outwardly against the surrounding coupling member and provide a fluid-tight seal, the groove in the hose flange end face facilitating outward displacement of said hose end flange.

4. In a hose structure, a connector sleeve having a plurality of axially extending radial openings in the external surface of the sleeve at equally spaced intervals circumferentially thereof, a hose connected at one end to said connector sleeve, inner and outer spirally wound layers of wires embedded in said hose and extending from end to end thereof with the end portions of a corresponding wire of each layer disposed in each of said axially extending openings on the connector sleeve, and means to anchor said end portions of the wires in said openings.

5. In a hose structure, a connector sleeve, an annular enlargement on said sleeve intermediate the ends thereof and having a plurality of axially extending radial openings in said enlargement at equally spaced intervals circumferentially thereof, a hose connected at one end to said connector sleeve, inner and outer spirally wound layers of wires embedded in said hose and extending from end to end thereof with the end portions of a corresponding wire of each layer disposed in each of said axially extending openings in the sleeve enlargement, means to anchor said end portions of the wires in said openings.

6. In a hose structure, a connector sleeve having an annular end face, a hose including inner and outer plies connected at one end to said connector sleeve with the inner ply of said hose extending through the sleeve and having an annular end flange portion overlying the annular end face of said sleeve and the outer ply of said hose overlying the exterior of said sleeve, a coupling member receiving said sleeve and having an angularly disposed surface engaging interiorly of the hose end flange to force the same outwardly against the surrounding coupling member and provide a fluid-tight seal.

7. In a hose structure, a connector sleeve having an annular end face, a hose including inner and outer plies connected at one end to said connector sleeve with the inner ply of said hose extending through the sleeve and having an annular end flange portion overlying the annular end face of said sleeve, said annular end flange having a groove in the end face thereof and having an angularly diverging inner wall, a coupling member receiving said sleeve and having an annular recess therein receiving said hose end flange, said annular recess of the coupling member having an angular inner wall correspondingly disposed with respect to the angular inner wall of the hose end flange and engaging interiorly against the same to displace said end flange outwardly against the surrounding coupling member and provide a fluid-tight seal, the groove in the hose flange end face facilitating outward displacement of said hose and flange.

8. In a hose structure, a connector sleeve having an annular end face, said annular end face of the sleeve having an annular recess therein, a hose including inner and outer plies connected at one end to said connector sleeve with the inner ply of said hose extending through the sleeve and having an annular end flange portion overlying the annular end face of said sleeve and anchored in the annular recess therein, said annular end flange having a groove in the end face thereof and having an angularly diverging inner wall, a coupling member receiving said sleeve and having an annular recess therein receiving said hose end flange, said annular recess of the coupling member having an angular inner wall correspondingly disposed with respect to the angular inner wall of the hose end flange and engaging interiorly against the same to displace said end flange outwardly against the surrounding coupling member and provide a fluid-tight seal, the groove in the hose flange end face facilitating outward displacement of said hose end flange.

JOHN A. MULLER.

REFERENCES CITED

The following references are of record in the file of this patent:

UNITED STATES PATENTS

| Number | Name | Date |
| --- | --- | --- |
| 1,847,218 | Lamb | Mar. 1, 1932 |
| 2,371,363 | Smith | Mar. 13, 1945 |